(12) United States Patent
Kastelic et al.

(10) Patent No.: US 11,691,776 B2
(45) Date of Patent: Jul. 4, 2023

(54) LOW DEPTH CRATE FOR CONTAINERS

(71) Applicant: SPF Groups, Byron, GA (US)

(72) Inventors: Alexander Ross Kastelic, Costa Mesa, CA (US); Jordon Drake Hale, Macon, GA (US); Glenn E. Rindfleisch, Thomasville, GA (US)

(73) Assignee: SPF Groups, Byron, GA (US)

( * ) Notice: Subject to any disclaimer, the term of this patent is extended or adjusted under 35 U.S.C. 154(b) by 0 days.

(21) Appl. No.: 17/315,635

(22) Filed: May 10, 2021

(65) Prior Publication Data

US 2022/0355966 A1 Nov. 10, 2022

(51) Int. Cl.
*B65D 1/24* (2006.01)
*B65D 21/02* (2006.01)

(52) U.S. Cl.
CPC ........ *B65D 1/243* (2013.01); *B65D 21/0212* (2013.01); *B65D 2501/2407* (2013.01); *B65D 2501/24108* (2013.01); *B65D 2501/24133* (2013.01); *B65D 2501/24152* (2013.01); *B65D 2501/24267* (2013.01); *B65D 2501/24401* (2013.01); *B65D 2501/24541* (2013.01); *B65D 2501/24592* (2013.01); *B65D 2501/24929* (2013.01)

(58) Field of Classification Search
CPC ............... B65D 1/243; B65D 21/0212; B65D 2501/2407; B65D 2501/24108; B65D 2501/24133; B65D 2501/24152; B65D 2501/24267; B65D 2501/24401; B65D 2501/24541; B65D 2501/24592; B65D 2501/24929
See application file for complete search history.

(56) References Cited

U.S. PATENT DOCUMENTS

| | | | |
|---|---|---|---|
| 3,392,869 A * | 7/1968 | Needt | B65D 1/243 220/518 |
| 5,704,482 A | 1/1998 | Apps et al. | |
| 5,855,277 A * | 1/1999 | Apps | B65D 1/243 206/427 |
| 10,322,838 B2 | 6/2019 | Clark | |
| 10,836,534 B2 | 11/2020 | Guerry et al. | |
| 11,319,130 B2 * | 5/2022 | Meers | B65D 71/70 |
| 2001/0015329 A1 * | 8/2001 | Apps | B65D 1/243 220/519 |

* cited by examiner

*Primary Examiner* — Andrew D Perreault
(74) *Attorney, Agent, or Firm* — Brooks Kushman P.C.

(57) ABSTRACT

A low depth crate for containers includes a base with a top surface and a bottom surface, and a wall structure extending upwardly around a periphery of the base. A plurality of recesses are defined in the bottom surface and arranged to engage containers loaded in a like crate therebeneath when in a stacked configuration. The plurality of recesses includes primary recesses capable of engaging at least two different sizes of containers, each primary recess having a first support region with a first depth with respect to the bottom surface and a second support region with a second depth with respect to the bottom surface, the first depth greater than the second depth. The wall structure may include four adjoined side walls each having a handle formed in a central portion of the side wall and extending upwardly above an upper rim of the side wall.

20 Claims, 10 Drawing Sheets

LOW DEPTH CRATE FOR CONTAINERS

TECHNICAL FIELD

Embodiments relate to a low depth crate for containers, such as beverage containers or dairy containers.

BACKGROUND

Dairy containers, such as milk jugs, are typically transported in reusable plastic dairy crates having a base and a peripheral sidewall structure extending upwardly therefrom. At the point of sale, the dairy containers are removed from the crate and placed in refrigerated coolers for purchase. The empty dairy crates are then returned to the source location to be reused and refilled with dairy containers for a subsequent shipment to retailers.

Some dairy crates are full depth crates which have an upstanding wall structure that extends approximately the full height of the containers loaded in the crate. When full depth dairy crates are filled with containers, the crates may be stacked with the wall structure substantially bearing the weight of the stacked crate(s) above it. However, when empty, such full depth crates consume a large volume of storage space.

As compared to full depth crates, low depth crates have an upstanding wall structure of lesser height than the containers received in the crate, making these crates more lightweight and cost effective due to the reduced plastic material used. When low depth crates are stacked with dairy containers loaded therein, the containers bear most of the load of the crate(s) stacked thereabove, with the closures or caps of the containers engaging a bottom surface of the base. Secure and reliable engagement of the container closures with the base bottom surface is necessary to ensure stability of the loaded, stacked crates.

SUMMARY

In one or more embodiments, a low depth crate for containers includes a base including a top surface and a bottom surface, and a wall structure extending upwardly around a periphery of the base. A plurality of recesses is defined in the bottom surface of the base and arranged to engage containers loaded in a like crate therebeneath when in a stacked configuration. The plurality of recesses includes primary recesses capable of engaging at least two different sizes of containers, each primary recess having a first support region with a first depth with respect to the bottom surface and a second support region with a second depth with respect to the bottom surface, wherein the first depth is greater than the second depth.

In one or more embodiments, the first support region may be arranged to engage a first-sized container and the second support region may be arranged to engage a second-sized container. The primary recesses are adjacent to corners of the crate and the second support region may be closer to the corners than the first support region. The plurality of recesses includes secondary recesses spaced in between the primary recesses, wherein the primary recesses may be larger than the secondary recesses. An arrangement of the plurality of recesses on the bottom surface may be symmetric about both longitudinal and transverse axes along the base.

In one or more embodiments, each of the plurality of recesses may include a support surface and a peripheral wall surrounding the support surface and extending downwardly therefrom, wherein a lower edge of the peripheral wall may form part of the bottom surface of the base. The peripheral wall may include a plurality of drain holes formed therein. A shape of each of the plurality of recesses defined by the peripheral wall may be symmetric.

In one or more embodiments, the top surface of the base may be generally flat and include a plurality of container support areas for supporting containers thereon when loaded in the crate. The base may include a lattice of struts which form the top surface of the base and extend downwardly to form the bottom surface of the base, the struts defining a pattern of openings in the base and connecting the plurality of recesses to each other.

In one or more embodiments, a low depth crate for containers includes a base including a top surface and a bottom surface, and a wall structure extending upwardly around a periphery of the base and including four adjoined side walls of equal length, each side wall having an upper rim. A handle is formed in a central portion of each side wall and extends upwardly above the upper rim, wherein a lower surface of the handle has a shape complementary to a shape of an upper surface of the handle and defines a nesting recess under the handle. When the crate is nested with a like crate therebeneath in any orientation, the nesting recess of the crate is arranged to receive the handle of the like crate.

In one or more embodiments, each handle may include a generally horizontal handle bar, handle supports integrally formed with the handle bar on either side thereof and projecting upwardly from the upper rim of the side wall, and a bridge portion joined with each end of the side wall, wherein a handle opening is defined under the handle bar, between the handle supports, and above the bridge portion.

In one or more embodiments, a low depth crate for containers includes a base including a top surface and a bottom surface, and a wall structure extending upwardly around a periphery of the base. A plurality of recesses is defined in the bottom surface of the base and arranged to engage containers loaded in a like crate therebeneath when in a stacked configuration. The plurality of recesses includes corner recesses each having a first support region for engaging first-sized containers and having a first depth with respect to the bottom surface, and a second support region for engaging second-sized containers and having a second depth with respect to the bottom surface, wherein the first depth is greater than the second depth. The plurality of recesses further includes intermediate recesses spaced in between the corner recesses for engaging second-sized containers, wherein the corner recesses are larger than the intermediate recesses.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-6, a low depth crate 100 for containers, such as beverage containers or dairy containers or milk jugs, is depicted according to one or more embodiments. The crate 100 may be molded from a plastic material such that it is durable, reusable, and recyclable. The crate 100 includes a base 102 and a wall structure 104 integrally molded with the base 102, the wall structure 104 extending around and upwardly from a periphery of the base 102. The wall structure 104 has a height less than a height of the containers received in the crate 100, as described further below. In one non-limiting example, the containers may be PET (polyethylene terephthalate) milk bottles, but the crate 100 may also be used with other types and sizes of containers constructed from different materials and with different liquid or solid contents. Exemplary contents may include, but are not limited to, milk, water, soda, juice, cooking oil, detergent, rice, grains, pet food, and others.

In one or more embodiments, the wall structure 104 includes four adjoined side walls 106 which are substantially equal in length, such that the crate 100 has a square configuration as illustrated herein. In this embodiment, the crate 100 may be symmetric about both longitudinal and transverse axes along the base 102 (see FIG. 4). However, a rectangular crate having opposed side walls with a different length than that of the opposed end walls is also contemplated. In one or more embodiments, the length and width of the crate 100 disclosed herein may be substantially similar to a standard, full depth milk crate for interchangeable production line compatibility.

It is understood that directional terms as noted herein (e.g., upper, lower, top, bottom, vertical, horizontal, downwardly, upwardly, etc.) simply refer to the orientation of various elements as illustrated in the accompanying figures and the manner in which elements may be oriented relative to each other. Such terms are provided for context and understanding of the embodiments disclosed herein and are not intended to be limiting.

Figure 1:
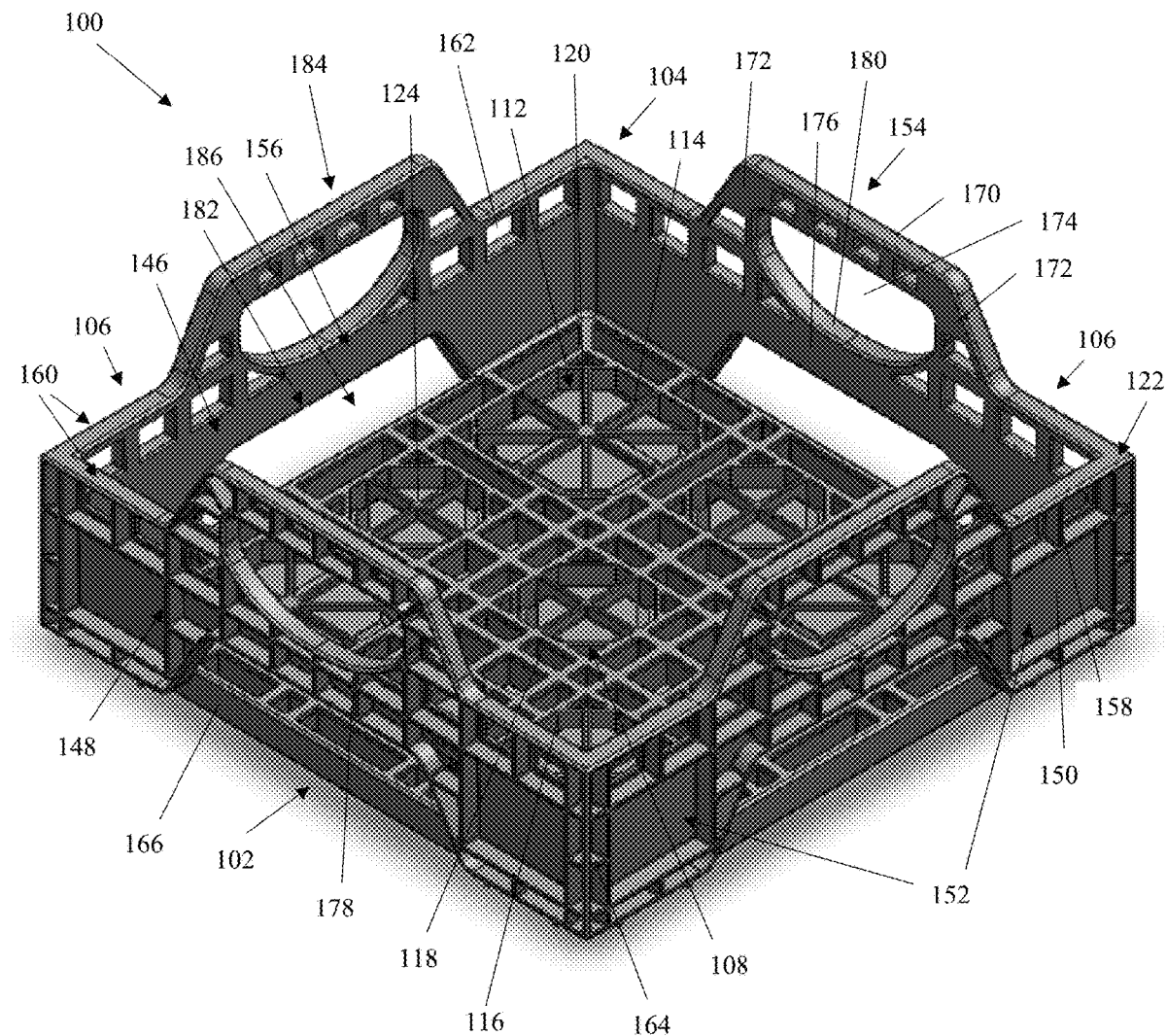
FIG. 1 is a top perspective view of a crate according to one or more embodiments.
Figure 2:
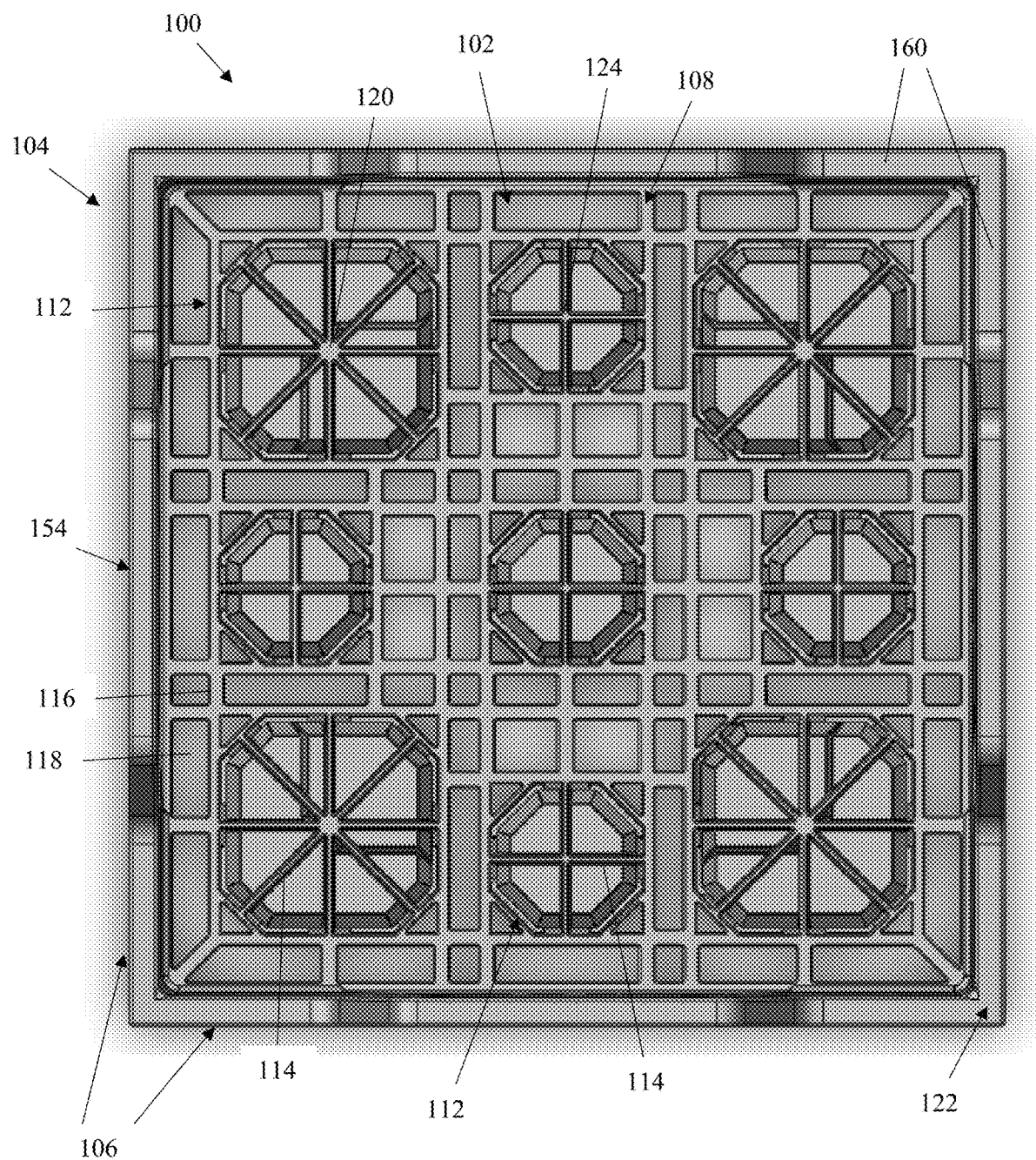
FIG. 2 is a top plan view of the crate.

Referring now to FIGS. 1-4, the base 102 includes a top surface 108 and an opposed bottom surface 110. As best illustrated in FIGS. 1 and 2, the top surface 108 of the base 102 may be generally flat and includes a plurality of spaced container support areas 112 for supporting containers thereon. In one or more embodiments, each container support area 112 is formed by a pattern of longitudinal, transverse, and/or diagonal support ribs 114 for supporting a container. In the exemplary embodiment shown herein, the support ribs 114 have a spoke-like configuration, but are not limited to this arrangement. Although the container support areas 112 are illustrated herein as being octagonal in shape, other shapes such hexagonal, square, or rectangular configurations are also contemplated. In one or more embodiments, the base 102 includes a lattice or grid of longitudinal, transverse, and/or diagonal struts 116 which form the top surface 108 of the base 102 and extend downwardly to form the bottom surface 110 of the base 102. The struts 116 define a pattern of openings 118 in the base 102 and connect adjacent container support areas 112 to each other. As opposed to a solid configuration, the lattice structure of the base 102 advantageously provides a lightweight crate 100, requires less material for construction and thus is cost effective, and also allows any unwanted liquids to drain through the base 102 such that the crate 100 may be easily cleaned and dried.

In one or more embodiments, the crate 100 is designed to accommodate at least two different sizes of containers loaded therein. In the exemplary embodiment shown in FIGS. 1-2, the container support areas 112 may include primary, corner support areas 120 disposed generally adjacent to the corners 122 of the crate 100, and secondary, intermediate support areas 124 disposed between the corner support areas 120. In one or more embodiments, the corner support areas 120 may be larger than the intermediate support areas 124, where the size of the corner support areas 120 provides versatility in the size of containers that may be supported thereon. The intermediate support areas 124 could also have a different shape than the corner support areas 120. In the depicted example, the 2×2 array of four corner support areas 120 may support four first-sized containers (e.g. gallon), and the 3×3 array of four corner support areas 120 plus five intermediate support areas 124 may support nine second-sized containers (e.g. half-gallon). Of course, the crate 100 can be sized up or down for holding a greater or fewer number of containers or for holding larger or smaller containers as desired. The exact number of container support areas 112 can be varied to yield crates having different capacities from the disclosed embodiments.

When low depth crates are stacked with containers loaded therein, such as for transport and distribution, the containers bear most of the load of the crate(s) stacked thereabove, with the closures or caps of the containers loaded in a lower crate engaging a bottom surface of the base of an upper crate. In the crate 100 disclosed herein, secure and reliable engagement of the container closures with the base bottom surface 110 is necessary to ensure stability of the loaded, stacked crates.

Turning now to FIGS. 3-4 and 8-11, a plurality of spaced recesses 126 are defined in the bottom surface 110 of the base 102. The recesses 126 are arranged to engage containers loaded in a like crate 100 therebeneath to aid in retaining the containers in vertically upright positions when the crates 100 are stacked, enhancing stability and minimizing excess movement of the containers. More specifically, the recesses 126 are arranged to receive the closures or caps of the containers loaded in the like, lower crate 100. Each recess 126 includes a support surface 128 and a peripheral wall 130 surrounding the support surface 128 and extending generally downwardly therefrom. In one or more embodiments, the peripheral wall 130 extends radially outward from the support surface 128 in a beveled configuration. Such a beveled structure of the peripheral wall 130 facilitates locating and aligning the container closures within the recesses 126, but also allows disengagement of the closures from the recesses 126 when desired, such as by rotating the crate 100 about a vertical axis. The lattice of struts 116 described above extend downward from the top surface 108 to form the bottom surface 110 of the base 102, defining the openings 118 in the base 102 and connecting adjacent recesses 126 to each other. A lower edge 132 of the peripheral wall 130 also may form part of the bottom surface 110 of the base 102. In one or more embodiments, the peripheral wall 130 includes a plurality of drain holes 134 formed therein which further reduce the weight of the crate 100 and allow drainage of any liquids.

As described above, the crate 100 is designed to accommodate at least two different sizes of containers when in a stacked configuration with a lower, like crate 100. In the exemplary embodiment shown in FIGS. 3-4, the recesses 126 may include primary, corner recesses 136 disposed generally adjacent to the corners 122 of the crate 100, and secondary, intermediate recesses 138 disposed between the corner recesses 136. The locations of the corner recesses 136 may substantially correspond to the locations of the corner support areas 120 on the opposed top surface 108, and the locations of the intermediate recesses 138 may substantially correspond to the location of the intermediate support areas 124 on the opposed top surface 108. In one or more embodiments, the corner recesses 136 may be larger than the intermediate recesses 138. The enlarged size of the corner recesses 136 provides versatility in the size of container that may be received and engaged therein, as described further below. Although the recesses 126 are illustrated herein as having a shape defined by the peripheral wall 130 which is symmetric and more specifically octagonal, other shapes such as, but not limited to, hexagonal, square, or rectangular configurations are also contemplated. In another alternative, the intermediate recesses 138 could have a different shape than the corner recesses 136.

The recesses 126 are configured so that the containers are securely retained in the crate 100 and unwanted movement of the containers during handling is prevented. As such, rather than just enlarging the corner recesses 136 as compared to the intermediate recesses 138 to accommodate the different container sizes, in one or more embodiments the corner recesses 136 have a bi-level configuration. Accordingly, in the corner recesses 136, the support surface 128 includes a first support region 140 and a second support region 142. The first support region 140 and the second support region 142 may each be generally planar, and are separated by a partition wall 144. The first support region 140 has a first depth with respect to the bottom surface 110 of the base 102 and the second support region 142 has a second depth with respect to the bottom surface 110 of the base 102, where the first depth is greater than the second depth. In an exemplary embodiment, the partition wall 144 may slope downwardly from the first support region 140 to the second support region 142. Alternatively, the partition wall 144 could have a substantially vertical orientation.

Figure 8:
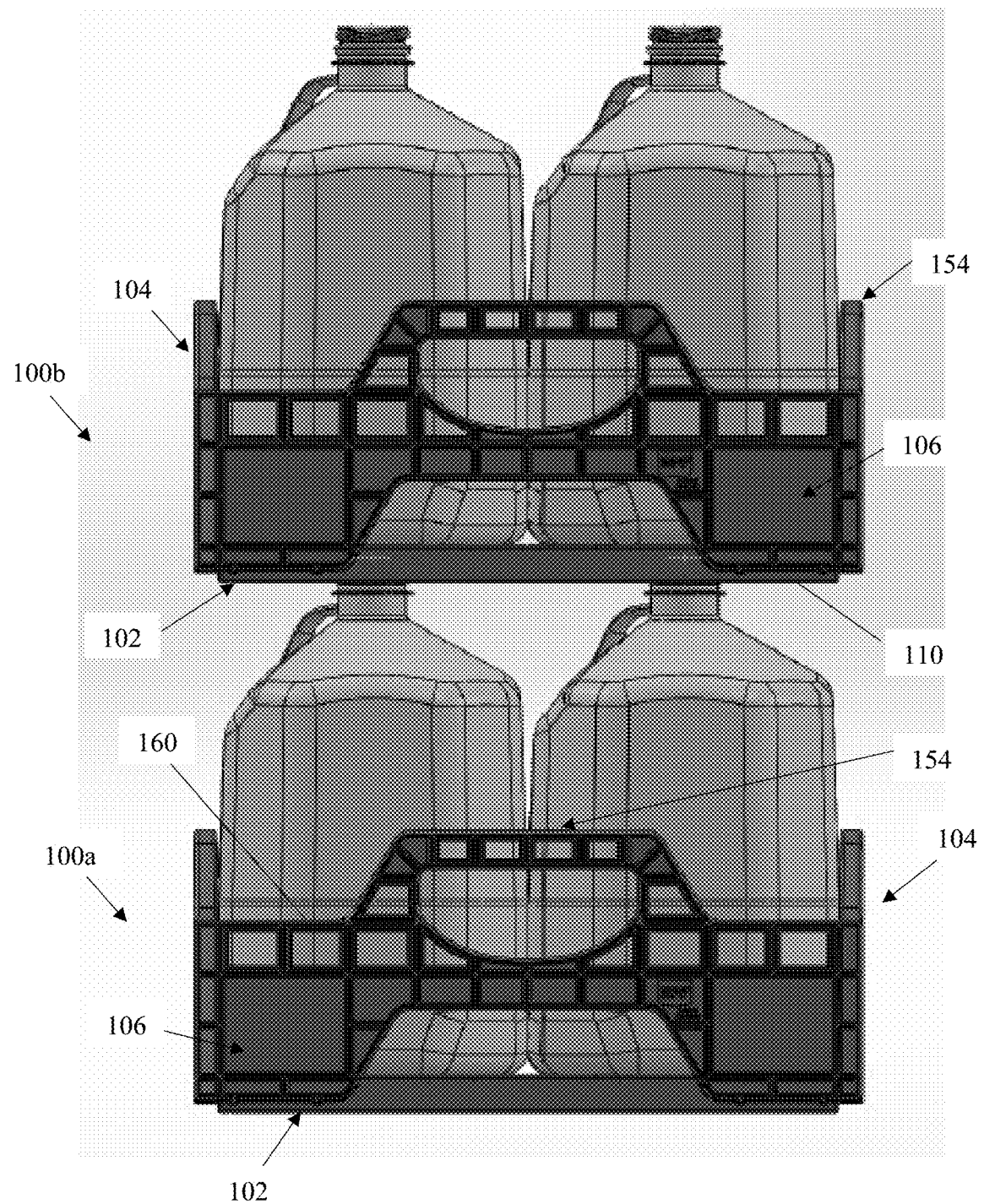
FIG. 8 is a side view of a lower crate and an upper crate each loaded with a first size of containers, with the upper crate stacked on the containers of the lower crate.
Figure 9:
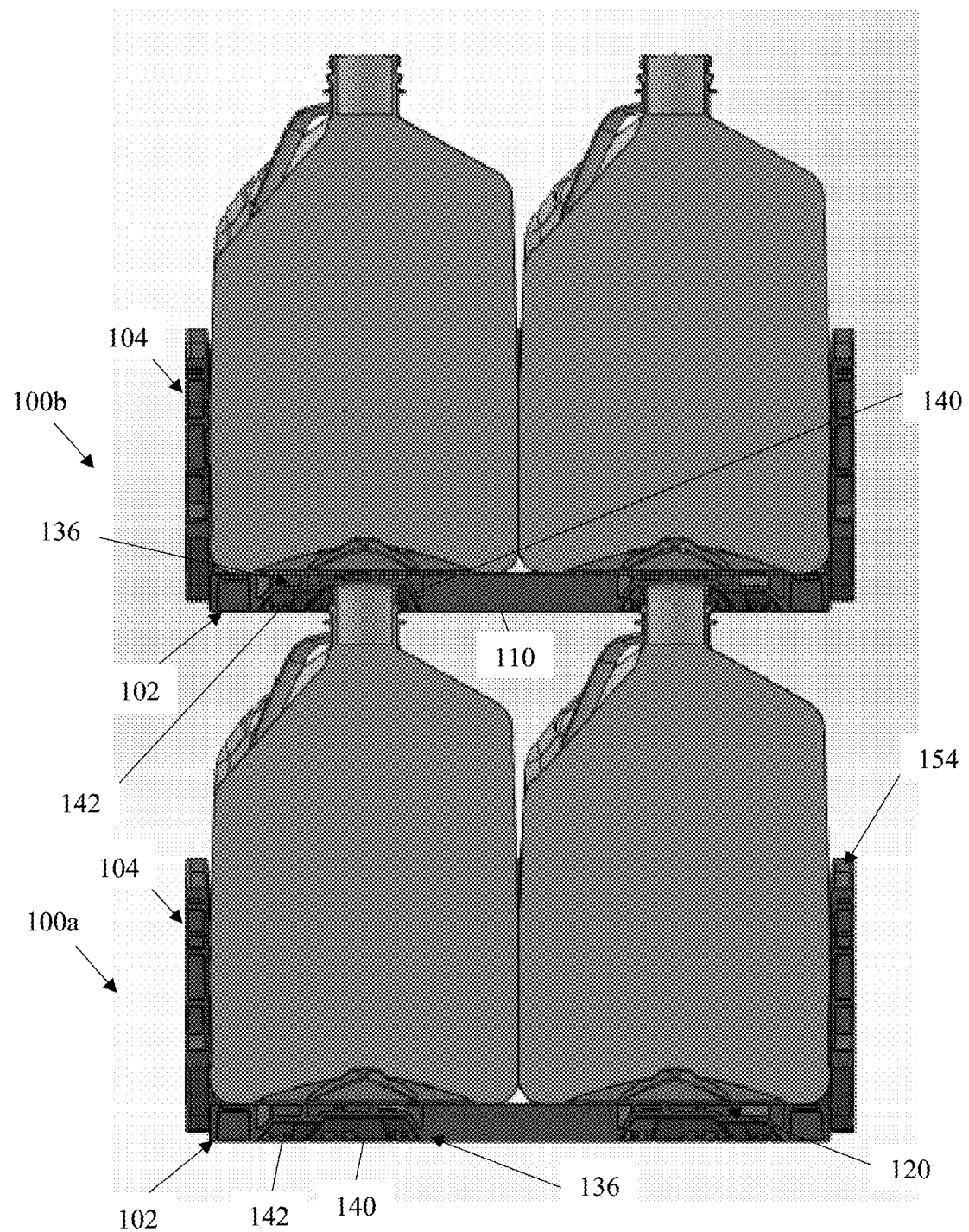
FIG. 9 is a cross-sectional view of the loaded, stacked crates and containers of FIG. 8.
Figure 10:
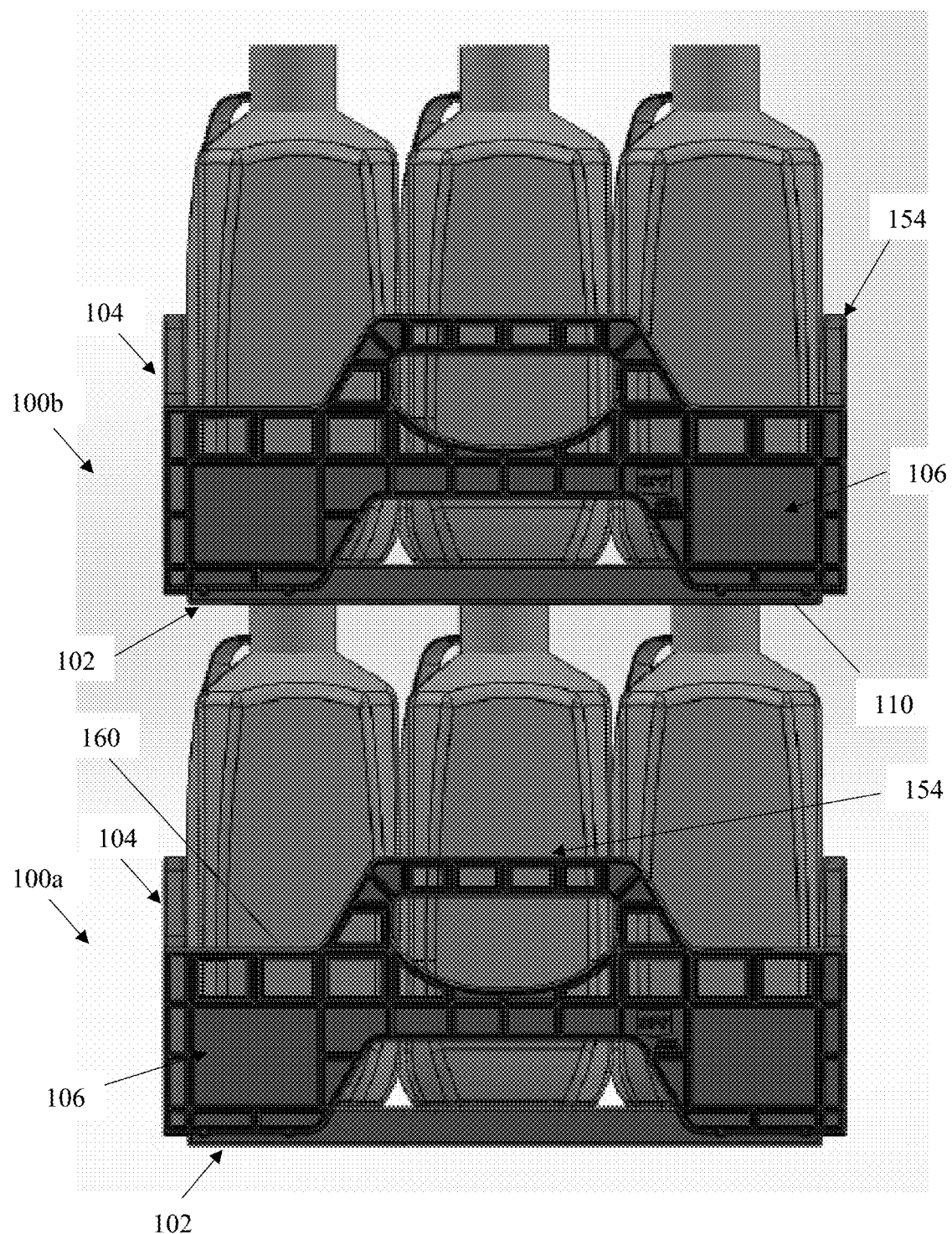
FIG. 10 is a side view of a lower crate and an upper crate each loaded with a second size of containers, with the upper crate stacked on the containers of the lower crate.
Figure 11:
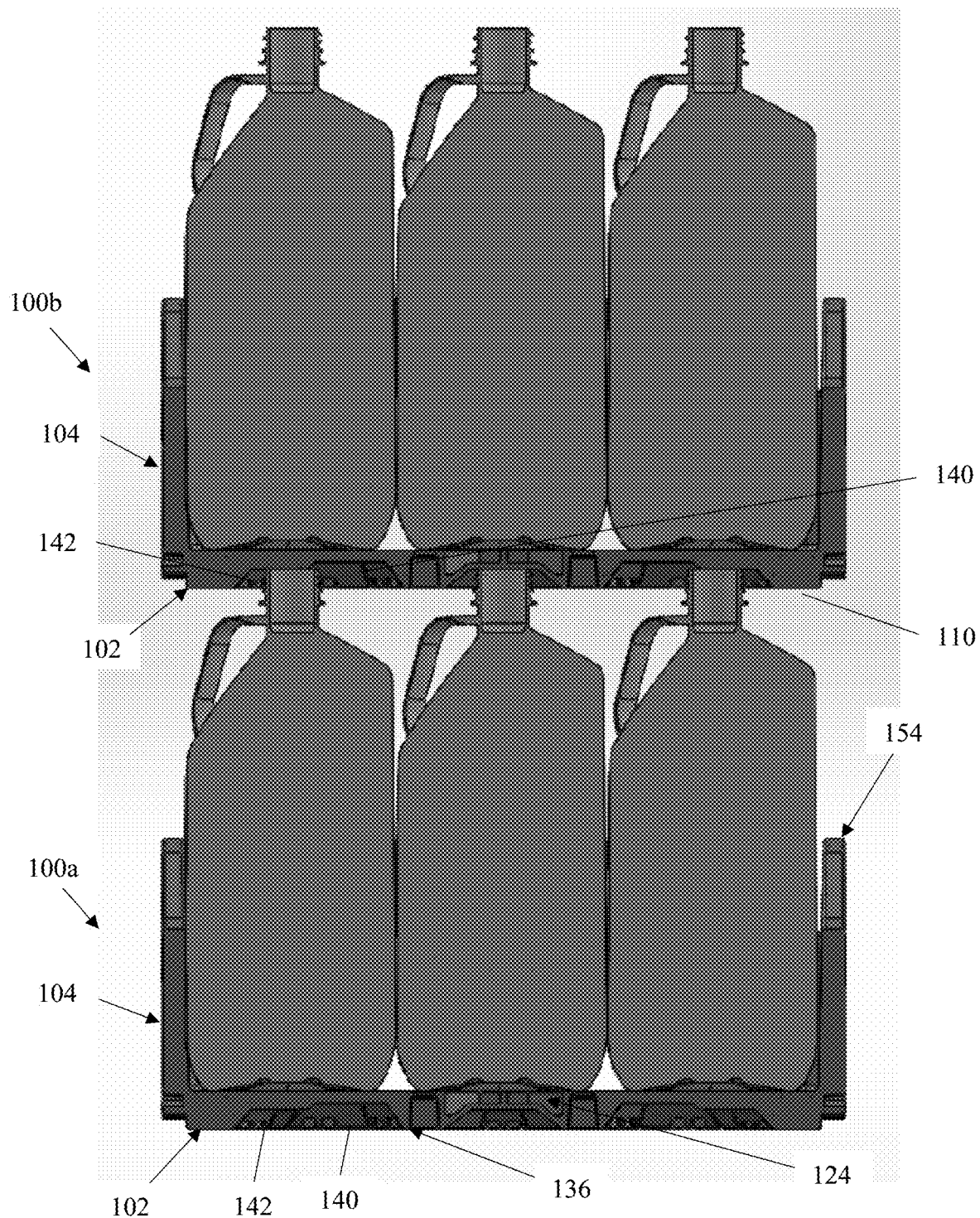
FIG. 11 is a cross-sectional view of the loaded, stacked crates and containers of FIG. 10.

FIGS. 8-9 illustrate a first, lower crate 100a and a second, upper crate 100b each loaded with first-sized containers, with the upper crate 100b stacked on the containers of the lower crate 100a. FIGS. 10-11 depict a side view of a lower crate 100a and an upper crate 100b each loaded with second-sized containers, with the upper crate 100b stacked on the containers of the lower crate 100a. In one or more embodiments, the configuration of the recesses 126 on the bottom surface 110 of the crate 100 may be symmetric about both longitudinal and transverse axes along the base 102 such that no specific orientation of the lower crate 100a and the upper crate 100b are required in order for them to stack together.

The first support region 140 is arranged to engage a first-sized container and the second support region 142 is arranged to engage a second-sized container. In the illustrated examples, each corner recess 136 may receive the closure of a first-sized container (e.g. gallon) via engagement with the first support region 140, and each corner recess 136 may receive the closure of a second-sized of container (e.g. half-gallon) via engagement with the second support region 142. In addition to providing an enlarged corner recess 136 with the versatility to accept the different container sizes, the bi-level configuration of the corner recesses 136 ensures that the closures of each type of container are captured and aligned securely within a subdivided, confined area. Furthermore, in the corner recesses 136, the closure engagement surface (i.e. first support region 140) for the loaded crate configuration with the fewest number of closures (e.g. gallon containers) may have an increased depth to enhance stability during stacking given the limited contact surface area between the closures and the crate 100. The closure engagement surface (i.e. second support region 142) for the loaded crate configuration with the greatest number of closures (e.g. half-gallon containers) may have a comparatively reduced depth, given the increased number of closures to spread the contact surface area between the closures and the crate 100. Of course, other depth and container size engagement arrangements for the corner recesses 136 are also fully contemplated and are not limited to the configuration described above.

Figure 3:
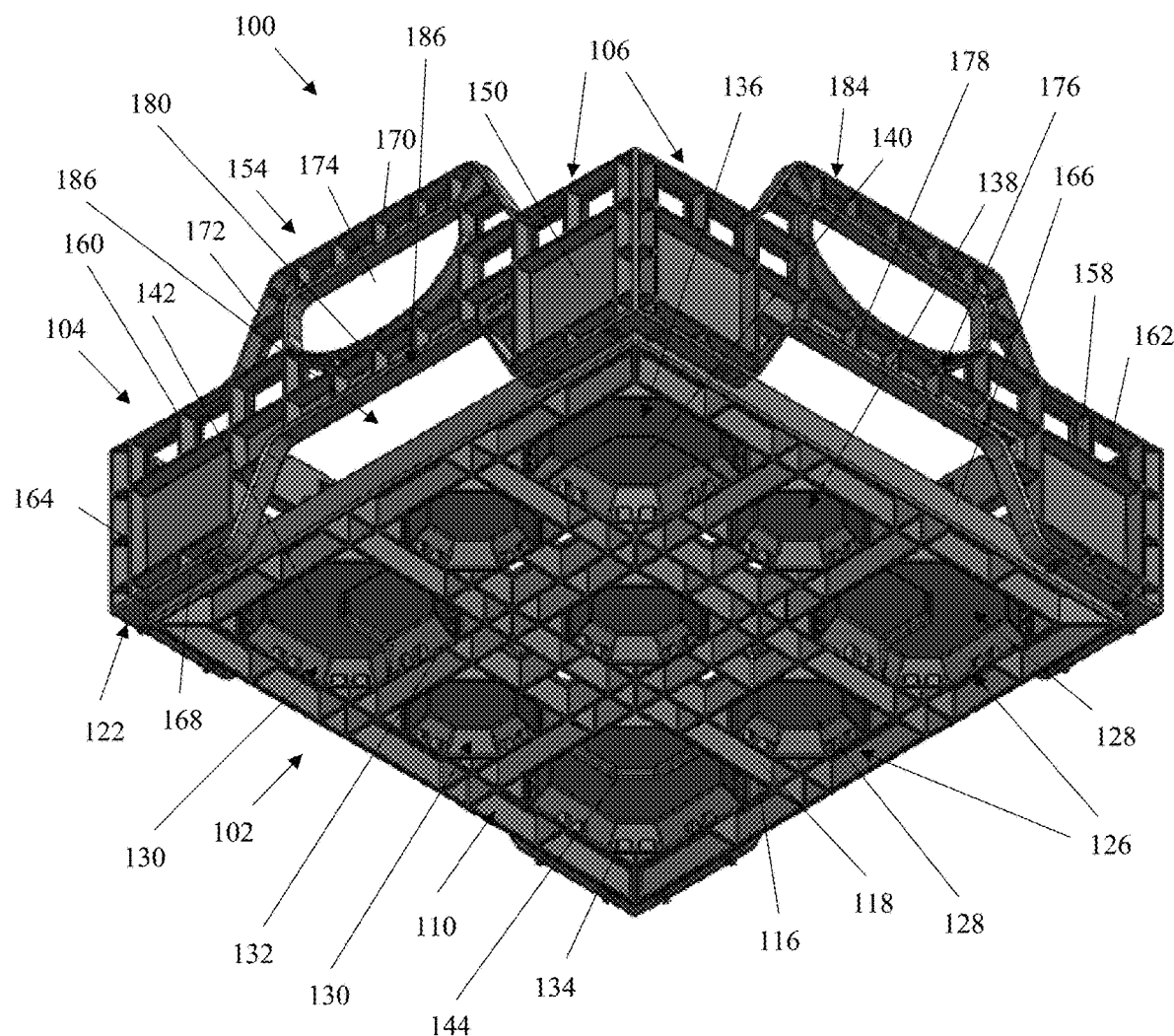
FIG. 3 is a bottom perspective view of the crate.
Figure 4:
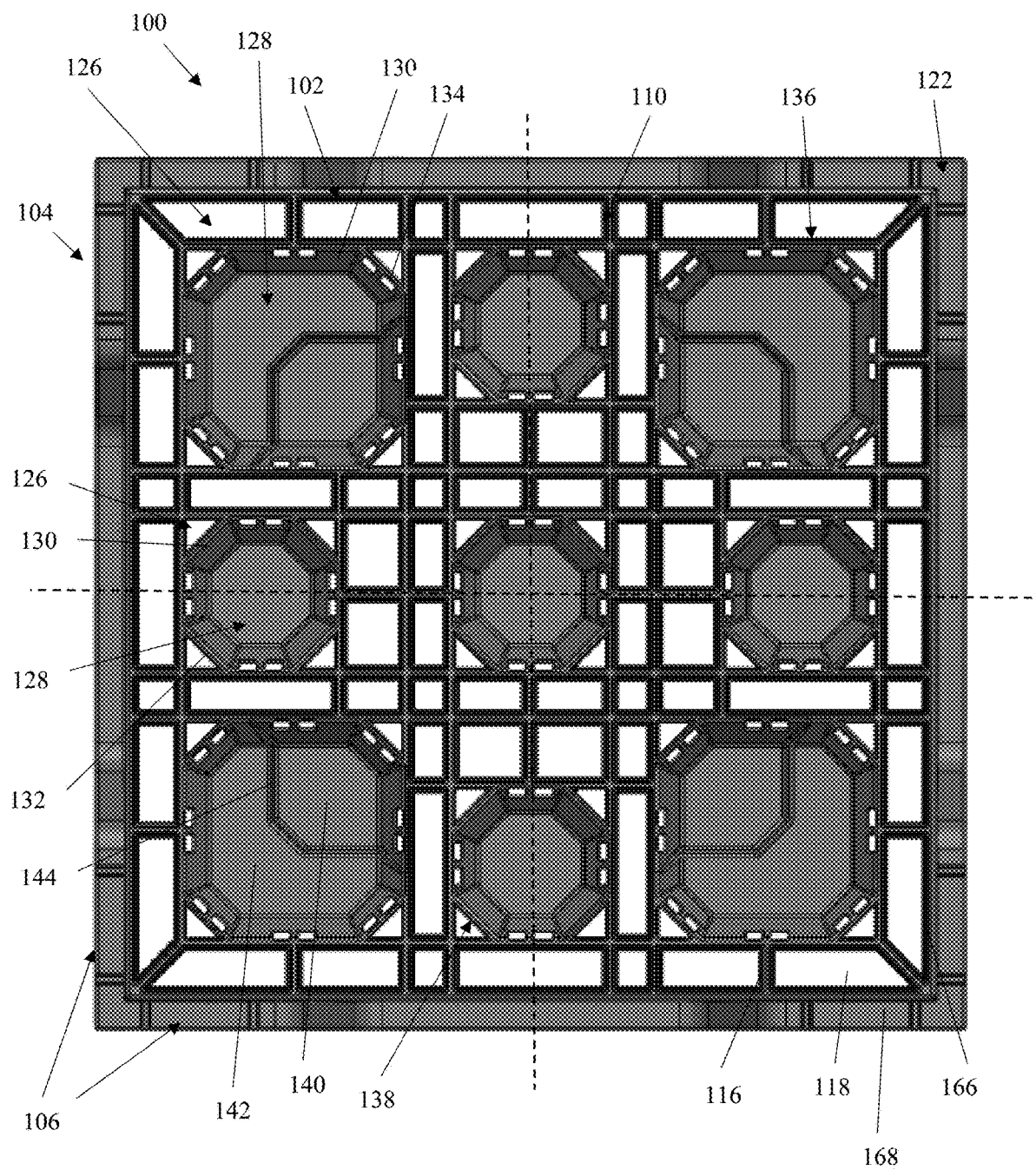
FIG. 4 is a bottom plan view of the crate.
Figure 5:
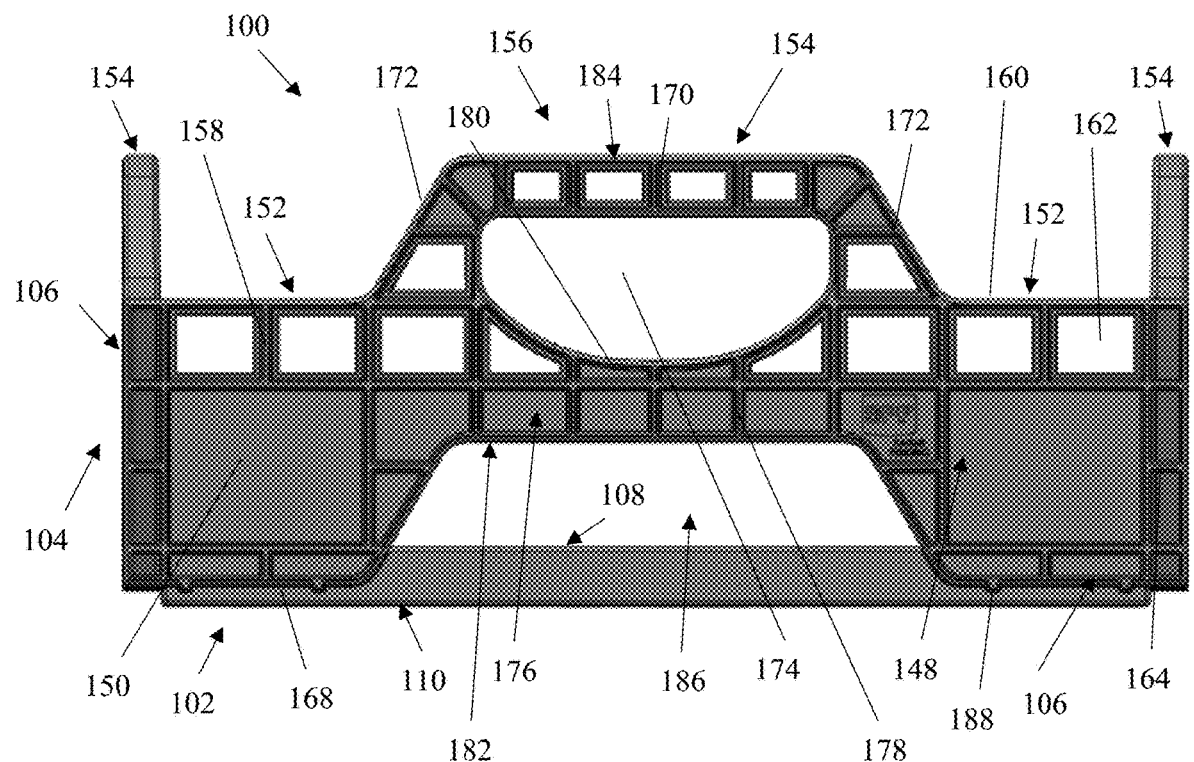
FIG. 5 is a side view of the crate.
Figure 6:
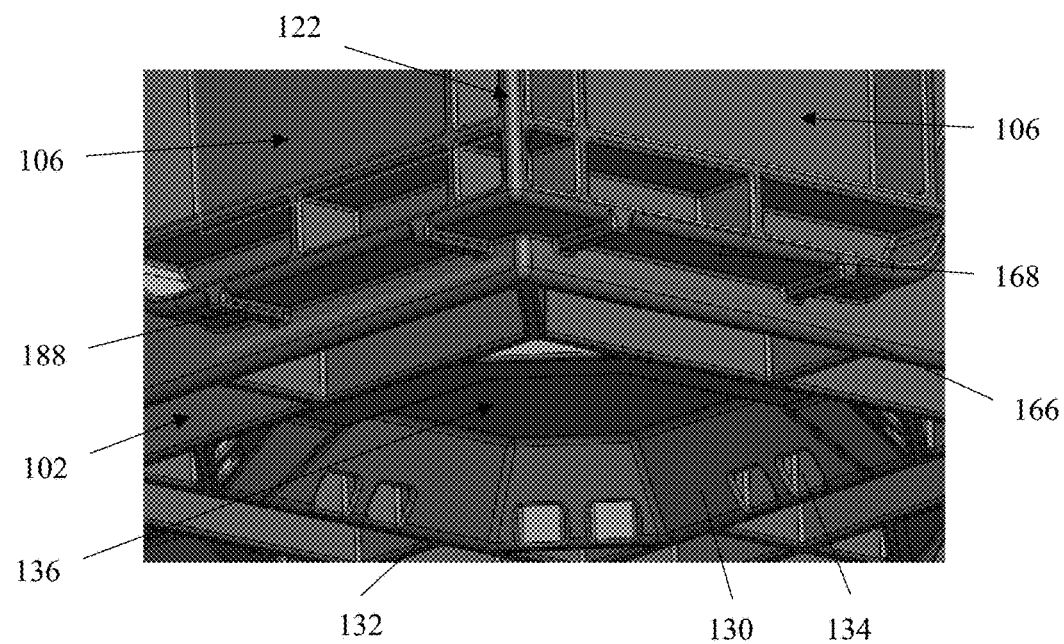
FIG. 6 is an enlarged partial bottom perspective view of a corner of the crate.

As shown in FIGS. 3-4, the partition wall 144 may be shaped such that an area of the second support region 142 may be larger than an area of the first support region 140. In this non-limiting example, the relatively smaller area of the first support region 140 may allow for more secure engagement with the container size (e.g. gallon containers) having the fewest number of closures and therefore the lowest contact surface area between the closures and the crate 100. Alternatively, the area of the first support region 140 may be substantially equal to the area of the second support region 142, or the area of the first support region 140 may be larger than the area of the second support region 142.

The positions and arrangement of the recesses 126 on the bottom surface 110 provide a range within which the container closures in a loaded crate 100 therebeneath may reside and still provide safe stacking. In the illustrated example, the 2×2 array of four corner recesses 136 may receive the closures of four first-sized containers (e.g. gallon), and the 3×3 array of four corner recesses 136 plus five intermediate recesses 138 may receive the closures of nine containers of a second size (e.g. half-gallon). Of course, the crate 100 can be sized up or down for receiving the closures of more or less containers or for receiving the closures of larger or smaller containers as desired. The exact number of recesses 126 can be varied to yield crates having different capacities from the disclosed embodiments.

Referring now to FIGS. 1, 3 and 5-6, each side wall 106 has an inner surface 146 and an outer surface 148. The inner surface 146 of each side wall 106 may be substantially flat and may include a solid, single-walled panel 150 at each end 152 of the side wall 106 adjacent the corners 122 of the crate 100. In one or more embodiments, a handle 154 may be provided in a central portion 156 of each side wall 106 between the ends 152, as described further below. A plurality of vertical ribs 158 may extend between each panel 150 and an upper rim 160 of the side wall 106, defining apertures 162 between the ribs 158. This configuration of the side walls 106 further reduces the weight and material required for the crate 100 while maintaining structural rigidity. The low height of the side walls 106 permits visibility of the container labels when containers are loaded in the crate 100. In one non-limiting example, each end 152 of the side wall 106 adjacent the corners 122 may have a height of approximately 3 inches above the top surface 108 of the base 102, and the handle 154 may have a height of approximately 5.5 inches from the bottom surface of 110 of the base 102. In this example, the height of both the side walls 106 and the handles 154 are arranged to be less than a height of a brand label panel of containers loaded in the crate 100.

The outer surface 148 of the side walls 106 may be substantially flat to allow individual crates 100 or stacks of crates 100 to be automatically or manually pushed against adjacent crates 100 during outbound or inbound work in progress, warehousing, loading, and distribution. On the outer surface 148, exterior ribs 164 may at least partially surround each panel 150, providing structural support for the side walls 106 without requiring a double-walled construction. The outer surface 148 may be disposed outboard from an edge 166 of the base 102, and a lower surface 168 of the side walls 106 may be disposed outwardly and upwardly from the bottom surface 110 of the base 102. With the lower surface 168 of the side walls 106 above the base bottom surface 110, engagement of the bottom surface 110 with transport machinery (e.g. hand trucks) is facilitated and the lower surface 168 of the side walls 106 is protected from unintended damage by the forks or container closures in stacked crates.

With a low depth crate, the handle is typically positioned below the upper rim, which creates a situation where the center of gravity of a loaded crate is above the handles, leading to potential instability. According to the disclosed embodiments, and with continuing reference to FIGS. 1, 3 and 5, the handle 154 is integrally molded with the side wall 106 and extends upwardly above the upper rim 160 of the side wall 106. The extended height of the handles 154 above the remainder of the wall structure 104 provides for easy lifting and safe handling of the crate 100, as the handles 154 are located at or above the center of gravity of the crate 100 when loaded with containers. The handles 154 ensure stable containment of containers loaded in the crate 100 while still remaining less than the height of the containers loaded in crate 100 so as to not interfere with the stacking of loaded crates 100.

In one or more embodiments, each of the four side walls 106 may include a handle 154 as depicted herein. However, it is also contemplated that only one pair of opposed side walls 106 could include handles 154. Each handle 154 includes a generally horizontal handle bar 170 which is integrally formed with handle supports 172 on either side thereof, where the handle supports 172 project upwardly from the upper rim 160 of the side wall 106. A handle opening 174 is defined under the handle bar 170, between the handle supports 172, and above a bridge portion 176 which may extend between the ends 152 of the side wall 106. The bridge portion 176 may include a plurality of ribs 178 to reinforce and strengthen the entire structure of the handle 154, and also to withstand metal drag hook use. In one or more embodiments, the handle 154 may have a generally trapezoidal configuration as shown, but is not limited to this shape.

The handle openings 174 are designed to be large enough to provide sufficient access for a user's hands to grasp the crate 100, and the configuration of the handles 154 provides sufficient clearance for a user's hands to grasp the crate 100 without enlarging the length or width dimensions of the crate 100. The ergonomic structure of the handle 154 allows the crate 100 to be grasped in a palm-up position where a user's fingers are inserted below handle bar 170 from the outside of the crate 100, or in a palm-down position where a user's fingers are inserted below handle bar 170 from the inside of the crate 100. In one non-limiting example, an upper surface 180 of the bridge portion 176 may be curved so as to provide a curved bottom of the handle opening 174 as shown, further facilitating easy gripping of the handle bar 170 by a user.

Figure 7:
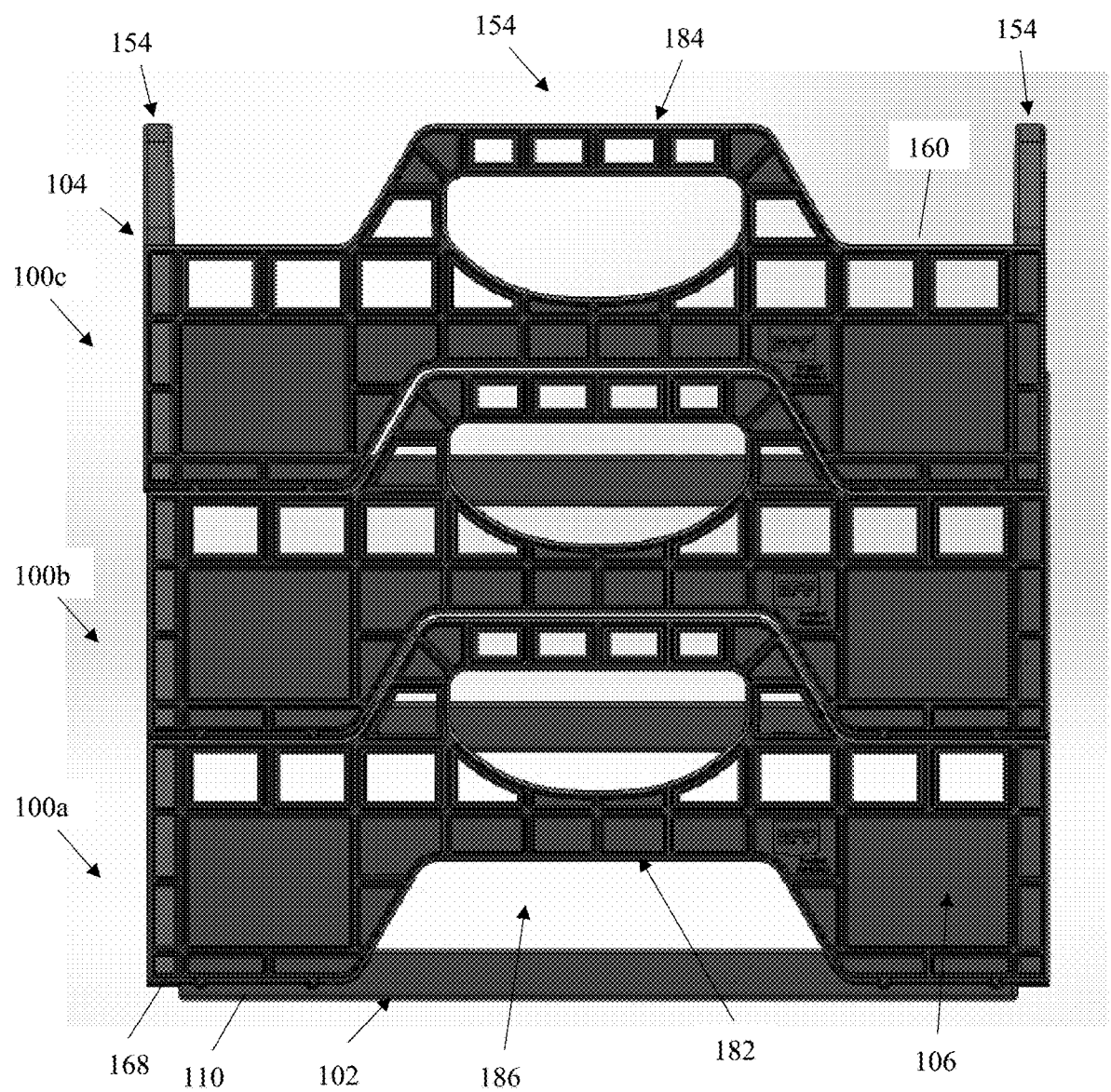
FIG. 7 is a side view of three crates nested together.

When empty, the crate 100 is nestable with other like crates, such as for conserving storage space. FIG. 7 is a side view of a first, lower crate 100a with a second, upper crate 100b nested thereon, as well as a third, top crate 100c nested on the upper crate 100b. During nesting, the side wall 106 of the upper crate 100b abuts and rests upon the side wall 106 of the lower crate 100a, and the side wall 106 of the top crate 100c abuts and rests upon the side wall 106 of the upper crate 100b. When nested, the handles 154 of the upper crate 100b are also configured to accommodate the handles 154 of the lower crate 100a, and the handles of the top crate 100c are configured to accommodate the handles 154 of the upper crate 100b. More particularly, a lower surface 182 of the handle (i.e. bridge portion 176) has a shape complementary to the shape of an upper surface 184 of the handle 154 (i.e., handle bar 170 and handle supports 172), defining a nesting recess 186 under the handle 154. When nested, the nesting recess 186 of the upper crate 100b is arranged to receive the handle 154 of the lower crate 100a such that the handle lower surface 182 of the upper crate 100b engages the handle upper surface 184 of the lower crate 100a, and similarly for the top crate 100c and the upper crate 100b. As such, even though the handles 154 are raised above the height of the side walls 106, the nesting recess 186 is designed to substantially receive the handle 154 of a lower like crate such that the combined nesting height of the upper and lower crates is not increased beyond the combined height of the side walls 106.

In a nested stack of crates 100, the corner 122 of the lower crate 100a supports the corner 122 of the upper crate 100b, and the weight of the upper crate 100b and the top crate 100c is transmitted vertically downward at the corners 122 of the crates 100 and along the side walls 106. As illustrated in the enlarged view of FIG. 6, each corner 122 may include reinforcing ribs 188 supporting the lower surface 168 of the side wall 106 to strengthen this area of the crate 100. In one or more embodiments, three nested crates 100a, 100b, 100c as illustrated in FIG. 7 may have substantially the same height as the height of a standard, full depth milk crate for optimal storage efficiency. In embodiments where the crate 100 is rectangular, it is understood that the crates 100 can be nested together with a specific orientation of each end of the crate 100 (i.e. 2-way nesting). In the disclosed embodiments where the crate 100 is symmetric (e.g. square), the crates 100 can be nested together in any orientation without requiring a specific orientation of one crate 100 with respect to another crate 100 (i.e. 4-way nesting), which maximizes versatility and ease of use.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A low depth crate for containers, comprising:
a base including a top surface and a bottom surface;

a wall structure extending upwardly around a periphery of the base; and a plurality of recesses defined in the bottom surface of the base and arranged to engage containers loaded in a crate therebeneath when in a stacked configuration, the plurality of recesses including primary recesses capable of engaging at least two different sizes of containers, each primary recess defined by a peripheral wall and having a first support region with a first depth with respect to the bottom surface and a second support region with a second depth with respect to the bottom surface, wherein the first depth is greater than the second depth, wherein the first support region and the second support region are separated by a partition wall extending across the primary recess and connected to the peripheral wall.

2. The low depth crate of claim 1, wherein the first support region is arranged to engage a first-sized container and the second support region is arranged to engage a second-sized container, wherein the first support region and the second support region are polygonal.

3. The low depth crate of claim 1, wherein the primary recesses are adjacent to corners of the crate and the second support region is closer to the corners than the first support region.

4. The low depth crate of claim 1, wherein the plurality of recesses includes secondary recesses spaced in between the primary recesses, wherein the primary recesses are larger than the secondary recesses.

5. The low depth crate of claim 1, wherein an arrangement of the plurality of recesses on the bottom surface is symmetric about both longitudinal and transverse axes along the base.

6. The low depth crate of claim 1, wherein first support region and the second support region are generally planar.

7. The low depth crate of claim 1, wherein the peripheral wall includes a plurality of drain holes formed therein.

8. The low depth crate of claim 1, wherein a shape of each of the plurality of recesses defined by the peripheral wall is symmetric.

9. The low depth crate of claim 1, wherein the top surface of the base is generally flat and includes a plurality of container support areas for supporting containers thereon when loaded in the crate.

10. The low depth crate of claim 1, wherein the base includes a lattice of struts which form the top surface of the base and extend downwardly to form the bottom surface of the base, the struts defining a pattern of openings in the base and connecting the plurality of recesses to each other.

11. The low depth crate of claim 1, wherein the wall structure includes four adjoined side walls each having an upper rim, wherein each side wall includes a handle formed in a central portion of the side wall and extending upwardly above the upper rim.

12. A low depth crate for containers, comprising:
a base including a top surface and a bottom surface, the bottom surface including a plurality of recesses defined therein and arranged to engage containers loaded in a lower crate therebeneath when in a stacked configuration, the plurality of recesses including primary recesses capable of receiving closures of at least two different sizes of containers, each primary recess defined by a peripheral wall and having a first support region and a second support region separated by a partition wall extending across the primary recess and connected to the peripheral wall;

a wall structure extending upwardly around a periphery of the base and including four adjoined side walls of equal length, each side wall having an upper rim; and a handle formed in a central portion of each side wall and extending upwardly above the upper rim, wherein a lower surface of the handle has a shape complementary to a shape of an upper surface of the handle and defines a nesting recess under the handle, wherein when the crate is nested with the lower crate in any orientation, the nesting recess of the crate is arranged to receive the handle of the lower crate.

13. The low depth crate of claim 12, wherein each handle includes a generally horizontal handle bar, handle supports integrally formed with the handle bar on either side thereof and projecting upwardly from the upper rim of the side wall, and a bridge portion joined with each end of the side wall, wherein a handle opening is defined under the handle bar, between the handle supports, and above the bridge portion.

14. The low depth crate of claim 12, wherein the first support region and the second support region are each polygonal and generally planar.

15. The low depth crate of claim 12, wherein the first support region has a first depth with respect to the bottom surface for engaging a first-sized container and the second support region has a second depth with respect to the bottom surface for engaging a second-sized container, wherein the first depth is greater than the second depth.

16. The low depth crate of claim 12, wherein the primary recesses are adjacent to corners of the crate and the second support region is closer to the corners than the first support region, and wherein the plurality of recesses includes secondary recesses spaced in between the primary recesses, wherein the primary recesses are larger than the secondary recesses.

17. The low depth crate of claim 12, wherein the top surface of the base is generally flat and includes a plurality of container support areas for supporting containers thereon when loaded in the crate.

18. The low depth crate of claim 12, wherein the base includes a lattice of struts which form the top surface of the base and extend downwardly to form the bottom surface of the base, the struts defining a pattern of openings in the base.

19. A low depth crate for containers, comprising:
a base including a top surface and a bottom surface;
a wall structure extending upwardly around a periphery of the base; and
a plurality of recesses defined in the bottom surface of the base and arranged to engage containers loaded in a crate therebeneath when in a stacked configuration, the plurality of recesses including
corner recesses each defined by a peripheral wall, each corner recess having a generally planar, polygonal first support region for engaging first-sized containers and having a first depth with respect to the bottom surface, and a generally planar, polygonal second support region for engaging second-sized containers and having a second depth with respect to the bottom surface, wherein the first depth is greater than the second depth, the first support region separated from the second support region by a partition wall extending across the corner recess and connected to the peripheral wall; and
intermediate recesses spaced in between the corner recesses for engaging second-sized containers, wherein the corner recesses are larger than the intermediate recesses.

20. The low depth crate of claim 19, wherein the wall structure includes four adjoined side walls each having an upper rim, wherein each side wall includes a handle formed in a central portion of the side wall and extending upwardly above the upper rim.

* * * * *